April 23, 1968  L. L. FINCANNON  3,379,391

FISHING REEL

Filed June 10, 1966

INVENTOR.
LEE L. FINCANNON

BY *Head & Johnson*

ATTORNEYS

United States Patent Office 3,379,391
Patented Apr. 23, 1968

3,379,391
FISHING REEL
Lee L. Fincannon, 9520 E. 11th, Tulsa, Okla. 74112
Filed June 10, 1966, Ser. No. 556,624
4 Claims. (Cl. 242—84.2)

This invention relates to a fishing reel. More particularly, the invention relates to an improved type of fishing reel in which the line is wound onto the reel by the rotation of the reel in a plane in which the line is being wound and in which line is extracted from the reel coaxially thereof.

Most of the fishing reels in present use are of two basic types. The first type involves a rotating spool in which the spool is rotated in one direction to wind the line thereon and is rotated in the opposite direction by the extraction of line therefrom. The second basic type utilizes a stationary spool having the axis at the right angle to the rod with which it is utilized, the line being extracted from the stationary spool coaxially thereof and wound onto the spool by a rotating pickup member which engages the line. The first type of reel has disadvantages in that casting of the line from the reel is difficult since casting requires the rotation of the spool. Most particularly the difficulty arises in that the spool, after having begun rotation, must be accurately stopped by the user otherwise after the line has been extracted by the cast the reel continues to rotate causing the line to become entangled. The second basic type of reel has eliminated this problem since there is no rotary inertial components utilized in line extraction. The second type of reel has become exceedingly popular in recent years since it can be used with less expertness than required of the first basic type. The second type of reel, however, has one serious disadvantage. As the line is wound onto the stationary spool by rotating the pickup member a twist is imparted into the line. This twist is not removed as the line is cast outward so that after repeated casts and rewind the amount of twist imparted to the line multiplies and becomes a serious problem.

The principal object of this invention is to provide a reel having the combined advantages of both basic types of reels in present use. That is, the object of this invention is to provide a reel in which the line is wound onto the reel by rotation thereof and is freely axially extracted from the stationary spool.

More specifically, an object of this invention is to provide a reel having a spool which is rotated to wind the fishing line directly thereon, and including a pivoted bail means whereby, in the casting position, the line is extracted axially of the spool.

Still more particularly, an object of this invention is to provide a fishing reel including a spool which is rotated to wind the fishing line directly thereon and including a pivoted bail permitting the free extraction of the fishing line in the casting position axially of the spool and further including means whereby the bail is automatically moved from the casting to rewind position upon the rotation of the spool.

Another object of this invention is to provide an improved fishing reel which substantially eliminates the disadvantages of other types of reels and one which is characterized by extreme simplicity and economy of construction.

These objects will be fulfilled by the following description and claims taken in conjunction with the attached drawings in which:

Figure 1:
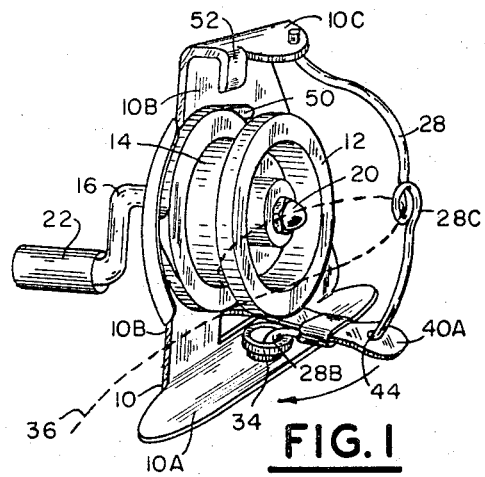
FIGURE 1 is an isometric view of the fishing reel of this invention showing the bail in cast position.

Referring now to the drawings, the reel of this invention is set forth in an exemplified embodiment, it being understood that the embodiment is illustrative only of the principles of the invention and that the principles may be incorporated in a multitude of various other physical arrangements. In the illustrative embodiment a body member 10 is provided having a foot portion 10A and an integral vertical portion 10B. The foot portion 10A is, in the typical application of the fishing reel of this invention, a horizontal portion by which the reel is affixed to a fishing rod. The body 10 further includes an upper horizontal lip portion 10C which extends substantially perpendicular the vertical portion 10B and parallel and spaced from the foot portion 10A.

Rotatably supported to the body vertical portion is a spool 12, the spool having a peripheral line receiving recess 14 therein. The spool 12 is rotatably supported to the body vertical portion 10B by a crank 16 which is rotatably received by the body vertical portion 10B. To augment the rotatable support of the crank 16 a collar 18 is illustrated as being secured to the body vertical portion 10B, the collar 18 rotatably receiving the crank 16. Spool 12 is secured to the crank 16 which is threaded at its outer end and has a nut 20 thereon. The end of the crank 16 opposite the nut 20 includes a rotatable handle 22 by which the crank and thereby the spool is rotated. To hold the spool 12 in secure engagement with the body vertical portion 10B a spring 24 (shown in FIGURES 4 and 5) is positioned between column 18 and a split washer 26 received in a groove in the crank 16.

Figure 2:
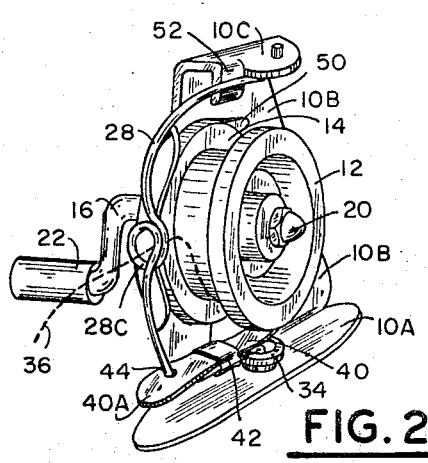
FIGURE 2 is an isometric view as shown in FIGURE 1 showing the bail in rewind position.
Figure 3:
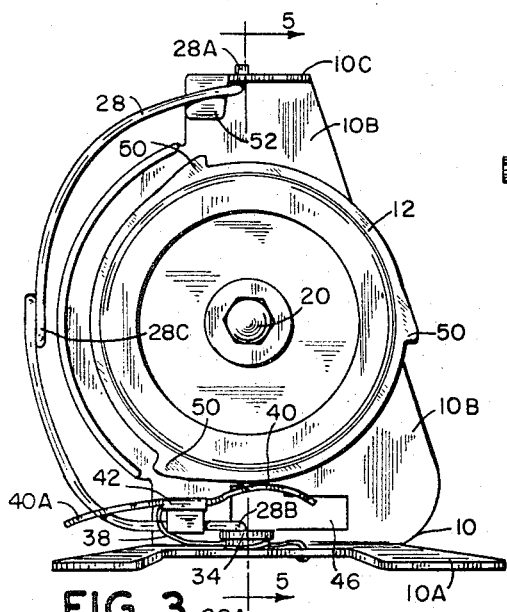
FIGURE 3 is a side view of the reel of this invention showing the bail in wind position.
Figure 4:
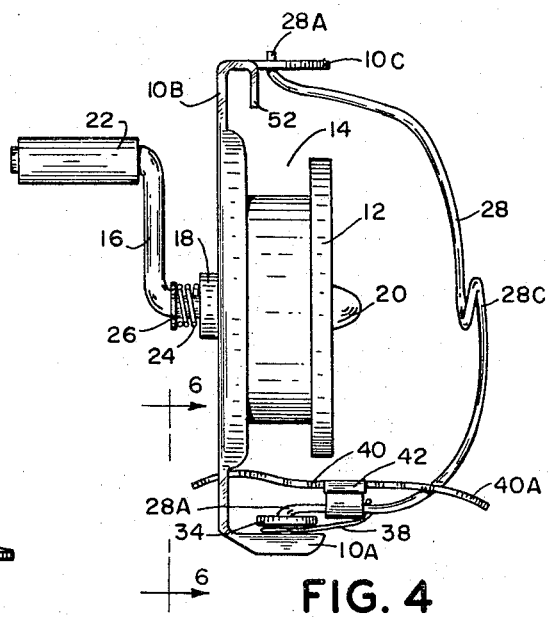
FIGURE 4 is a front view of the fishing reel of this invention showing the bail in cast position.
Figure 5:
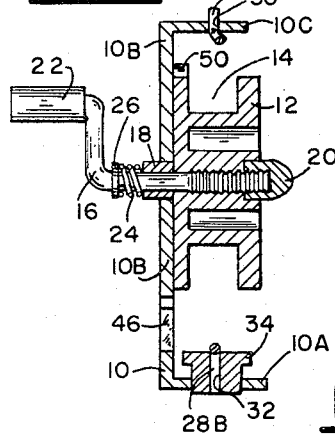
FIGURE 5 is a cross-sectional view taken along the line 5—5 of FIGURE 3.

A substantially C-shaped bail 28 has an upper end 28A pivotally extending through an opening 30 in the body lip portion 10C. The lower end 28B of the bail is received by opening 32 (see FIGURE 5) and an upstanding collar 34 affixed to the body foot portion 10A. Bail 28 is pivotal between two operating positions. In the first position, illustrated in FIGURES 2 and 3, the bail is in rewind position. An eyelet 28C is formed in the bail intermediate the upper and lower ends 28A and 28B. The eyelet 28C receives a fishing line 36 (FIGURES 1 and 2) and guides the line during the rewind and extraction thereof from the reel. In the rewind position of FIGURES 2 and 3 the bail 28 is pivoted to extend in the plane of the spool 12 so that rotation of the spool, by rotation of the crank 16, winds the line 36 directly into the line receiving recess 14. The second operative position of the bail 28 is illustrated in FIGURES 1 and 4 and is termed the cast position. In this position the line 36 may be extracted directly axially of the spool 12 at the end thereof opposite the crank 16. This position permits the free and unrestricted extraction of line from the reel without requiring rotation of the reel. Thus, in the rewind position of FIGURES 2 and 3, the fishing line is wound directly onto the reel by rotation of the reel without imparting any twist to the line and in the cast position of FIGURES 1 and 4 the line is freely extracted from the reel.

Figure 6:
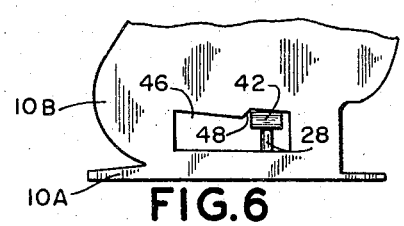
FIGURE 6 is a partial view of the lower portion of the side of the reel opposite the bail as seen along the lines 6—6 of FIGURE 4.

To improve the effectiveness of the reel and make the operation thereof substantially automatic, means are provided for automatically returning the bail 28 to the rewind position upon the rotation of the spool 12. A spring 38 is coiled around the collar 34 and has one end thereof in engagement with the bail 28 and the other end in engagement with the body 10. Coiled spring 38 is arranged to urge the bail 28 towards the rewind positions of FIGURE 2 and 3. To retain the bail 28 in cast position of FIGURES 2 and 4, a flattened spring 40 is affixed to the lower portion of bail 28, such as by means of clip 42. One end 40A of the spring has an opening 44 which receives bail 28 so that the spring extends in the plane of the bail. The lower portion of the vertical body portion 10B is provided with an opening 46 (see FIGURE 6). A part of the periphery of the opening 46 is defined by a notch 48. When the bail 28 is moved to the rewind position a portion of spring 40 is received by opening 46 and engaged by notch 48. Thus, the notch 48 retains the bail 28 in the cast position after it has been moved to this position and prevents the constraining force of coil spring 38 from returning the bail to the rewind position.

An important feature of the reel of this invention is the the provision of means whereby the bail 28 is automatically returned to rewind position upon rotation of the spool 14. This is accomplished by means of cam portions 50 which extend from the periphery of the spool. As spool 12 is rotated the protruding cam portions 50 engage the flattened spring 42 and move it downwardly out of engagement with notch 48. After the engagement of spring 40 with the notch 48 released the bail is freely rotated back to the rewind position by coiled spring 34.

To insure the alignment of bail 28 in the plane of the spool 12 when the bail is in rewind position an integral downwardly extending stop portion 52 is provided extending from the lip portion 10C.

The operation of the reel is as follows. To cast the line the bail 28 is mainly moved to cast position as shown in FIGURES 1 and 4, the flattened spring 40 engaging the notch 42 to insure that the bail will be retained in such position. The line may then be freely cast from the reel, the user controlling the cast by application of his thumb to the back portion of the spool if desired. The spool 12 remains stationary during casting. After the cast, and when the operator desires to retrieve the line, crank 16 is rotated. The first cam portion 50 which engages the flattened spring 40 forces it downwardly and out of engagement with notch 42 and the coil spring 38 returns the bail to the rewind position of FIGURES 2 and 3. Continued rotation of the spool 12 causes the line to be wound into the recessed area 14.

As previously indicated many alternate arrangements will be readily suggested. Other means of urging the bail 28 from cast to rewind position will be readily suggested. In addition, a gear train may be interposed between the crank 16 and spool 12 to vary the drive ratio between these components, and various breaking means may be provided, all within the skill of the art and in keeping within the principles of the invention exemplified in the disclosed embodiment.

While the invention has been described with a certain degree of particularity it is manifest that many other changes may be made without departing from the spirit and scope of the invention.

What is claimed:
1. A fishing reel comprising:
  a body member including a foot portion, the foot portion providing means of affixing the reel to a fishing rod;
  a vertical spool rotatably supported by said body member having a peripheral recess adaptable to windably receive a fishing line thereon;
  a crank means rotatably supported by said body for the rotation of said spool;
  a vertical bail pivotally supported to said body adjacent said spool, said bail having a line receiving eyelet, said bail pivotal in one position, termed a rewind position, wherein said eyelet is in the plane of said spool and spaced from said peripheral recess and in a second position, termed a cast position, wherein said eyelet is substantially coincident with the axis of said spool and spaced therefrom;
  resilient means normally urging said bail to said rewind position;
  retaining means with said bail releasably retaining said bail in cast position against said resilient means; and
  means on said spool for releasing said retaining means upon rotation of said spool whereby upon the rotation of said spool said resilient means pivots said bail to said rewind position.

2. A fishing reel according to claim 1 wherein said body includes a notch thereon and wherein said retaining means includes a flattened spring carried by said bail engageable with said notch when in the said cast position whereby said bail is releasably retained in said cast position, and wherein said releasing means includes at least one cam portion extending from the periphery of said spool which, upon the rotation of said reel, engages said flattened spring when said bail is in said cast position to release said flattened spring from said notch and permit said resilient means to pivot said bail to the rewind position.

3. A fishing reel according to claim 1 wherein said body member includes a vertical portion, said spool being rotatably supported to said body vertical portion, said body having an upper horizontal lip portion extending substantially parallel and spaced from said foot portion wherein said bail is of C-shaped configuration having the bottom end pivoted to said foot portion and the top end pivoted to said lip portion, said line receiving eyelet being intermediate said bail bottom and top ends.

4. A fishing reel according to claim 3 wherein said retaining means includes an opening in said body vertical portion above said foot portion and below said spool periphery, said opening defined in part by a notch and including a flattened horizontally extending spring affixed to said lower portion of said bail, one end of said flattened spring received by said opening in said body vertical portion when said bail is pivoted to the cast position and releasably retained by said notch, and wherein said releasing means includes at least one cam portion projecting from the periphery of said spool which, upon the rotation of said spool, engages and forces downwardly said flattened spring when said bail is in cast position releasing said flattened spring from said notch.

References Cited

UNITED STATES PATENTS 2,590,369   3/1952   Beeler _____ 242—84.2
2,767,934   10/1956  Miller _____ 242—84.2

FOREIGN PATENTS 984,452   2/1951   France.
430,866   2/1948   Italy.

BILLY S. TAYLOR, *Primary Examiner.*